Figure 1:
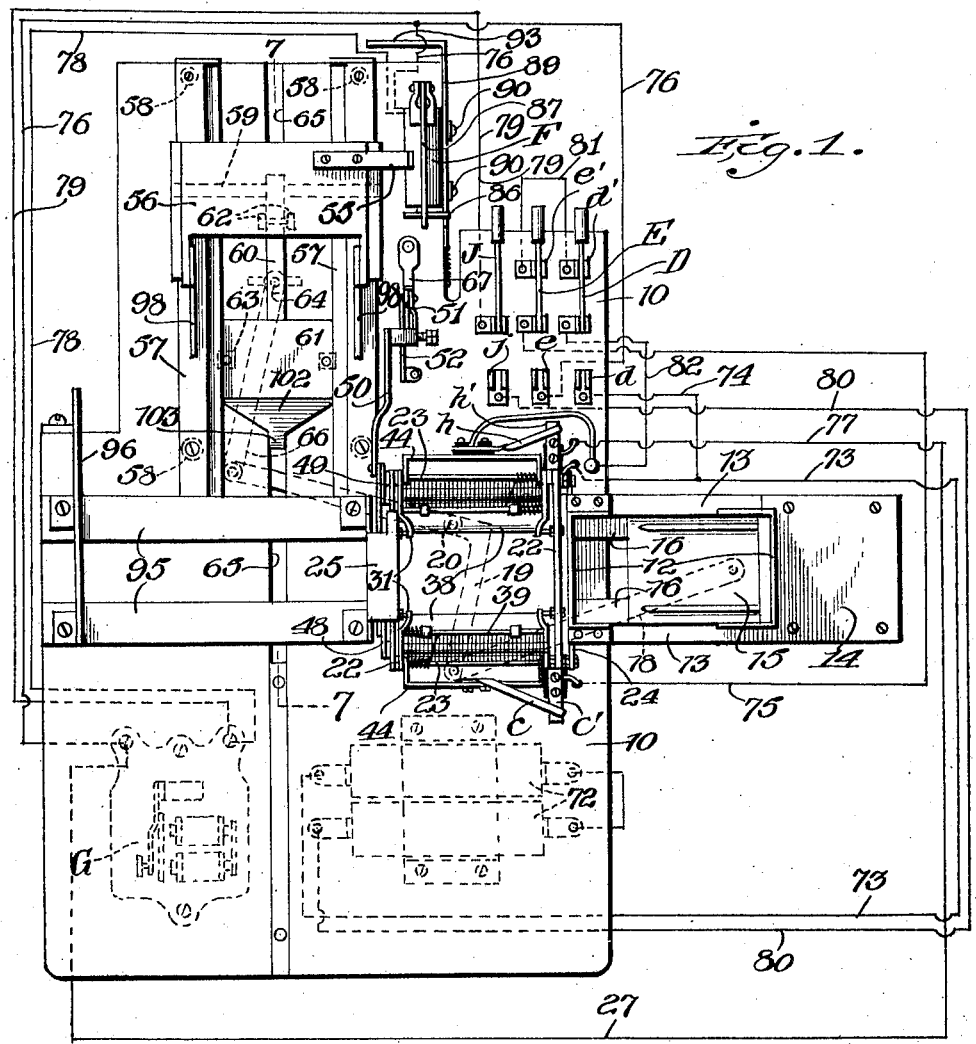

P. C. RAYMOND.
RECORDING SYSTEM AND SELECTOR MECHANISM THEREFOR.
APPLICATION FILED JULY 15, 1918.

1,393,827. Patented Oct. 18, 1921.
6 SHEETS—SHEET 1.

Inventor
Paul C. Raymond
By Peirce, Fisher & Clapp
Attorney

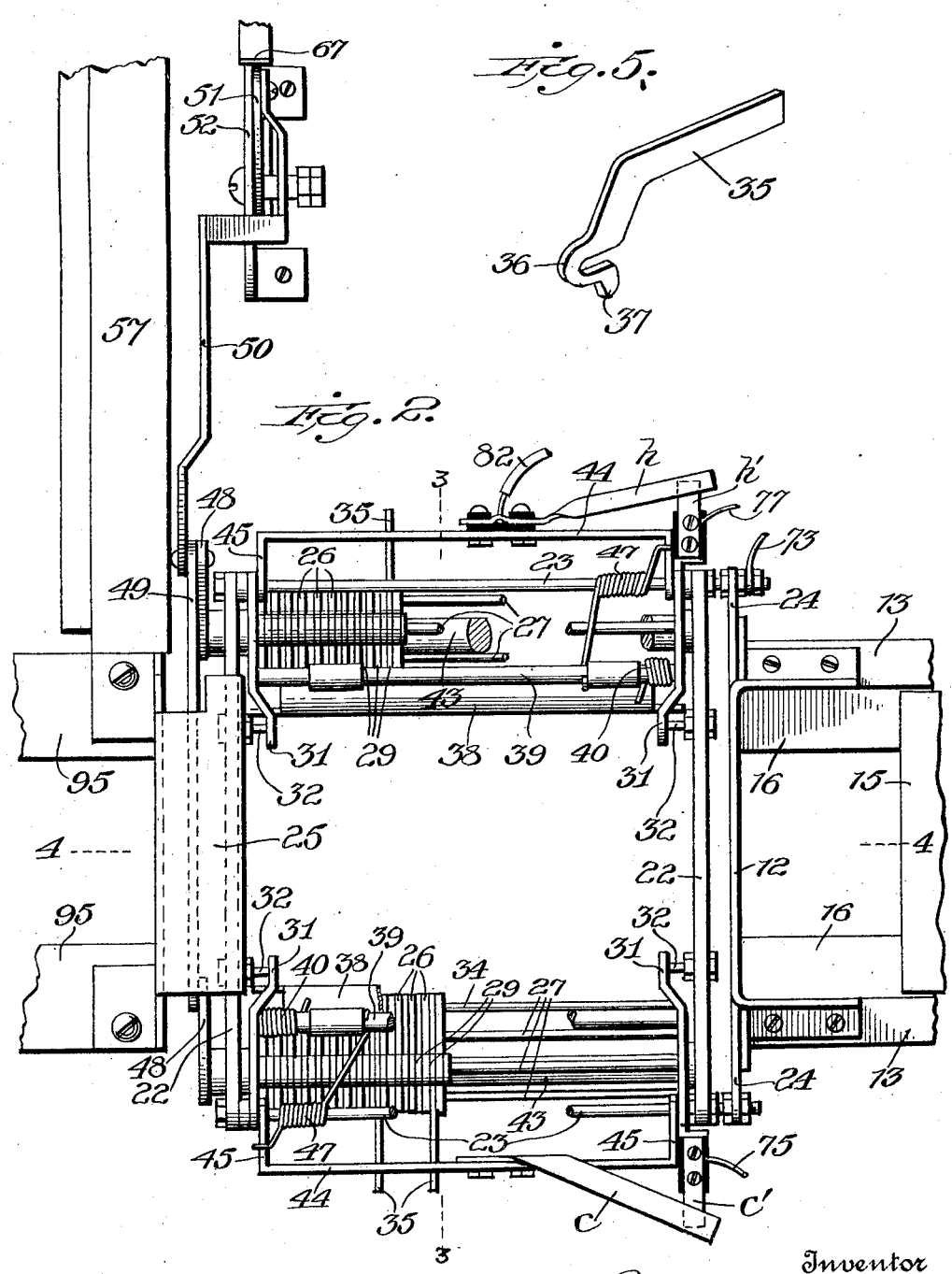

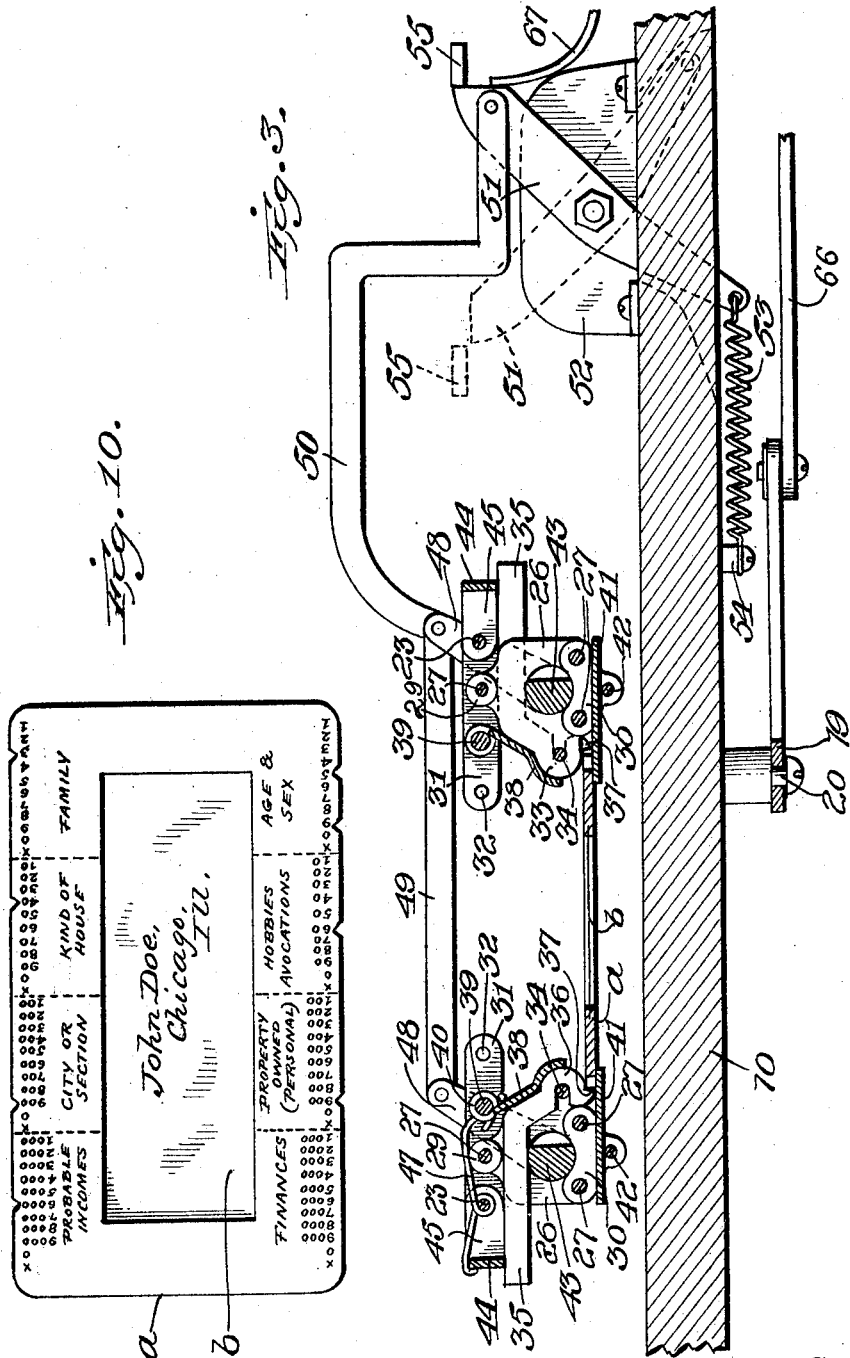

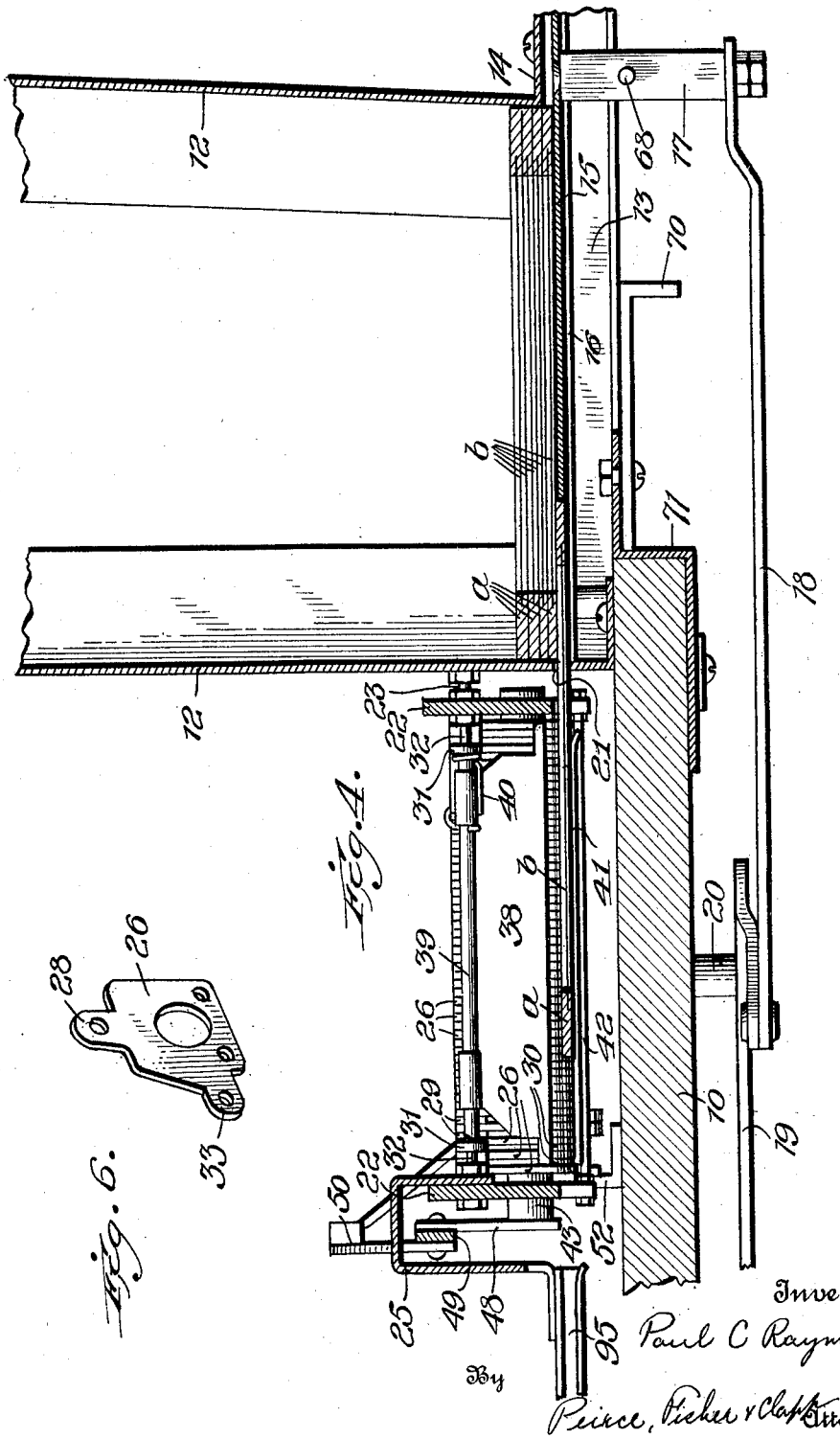

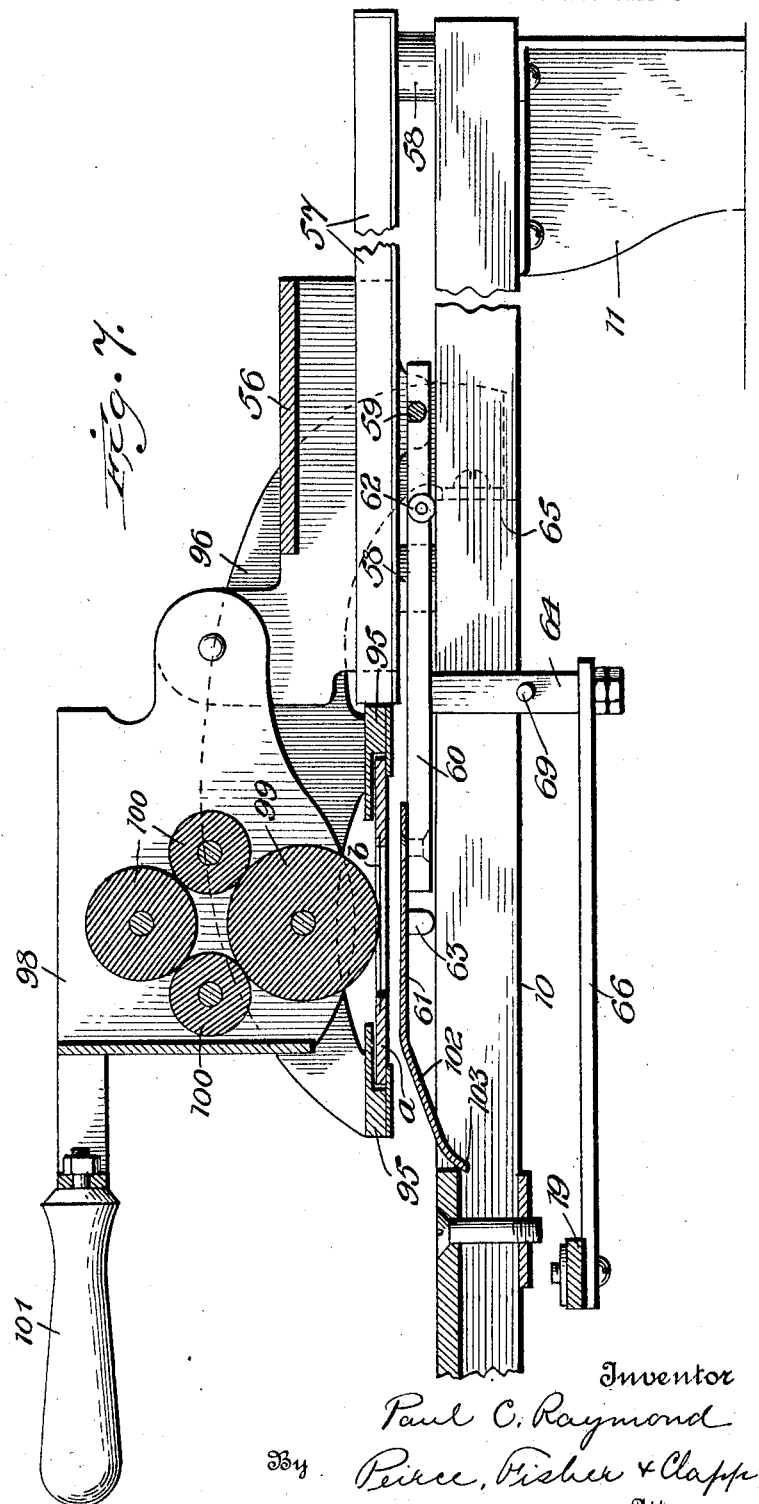

P. C. RAYMOND.
RECORDING SYSTEM AND SELECTOR MECHANISM THEREFOR.
APPLICATION FILED JULY 15, 1918.
1,393,827.
Patented Oct. 18, 1921.
6 SHEETS—SHEET 6.
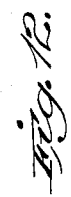
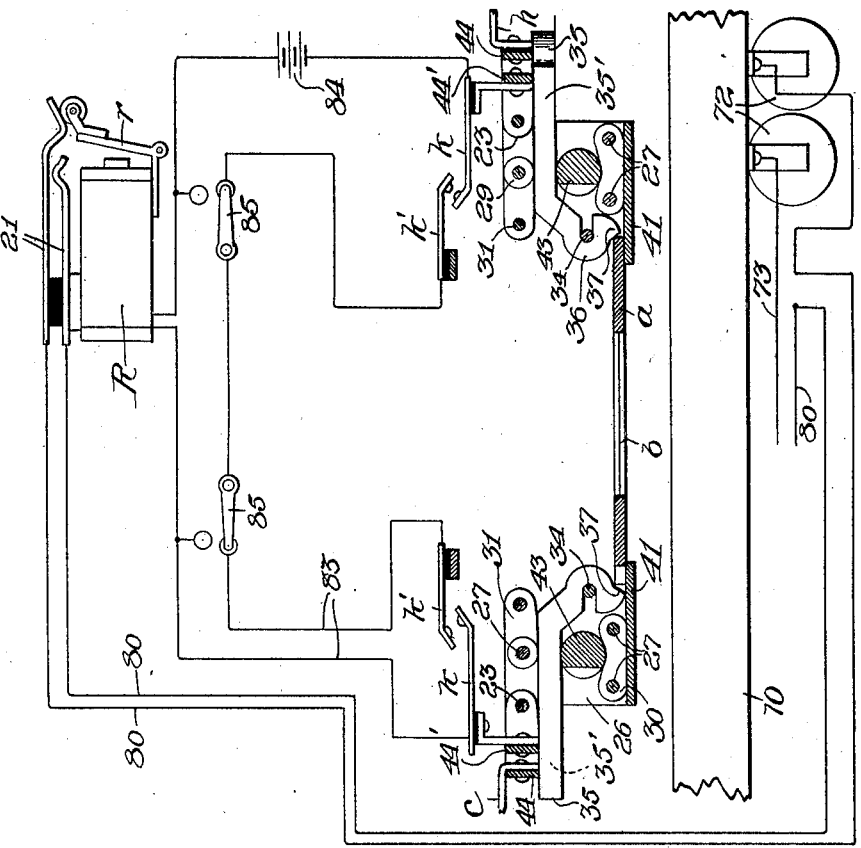
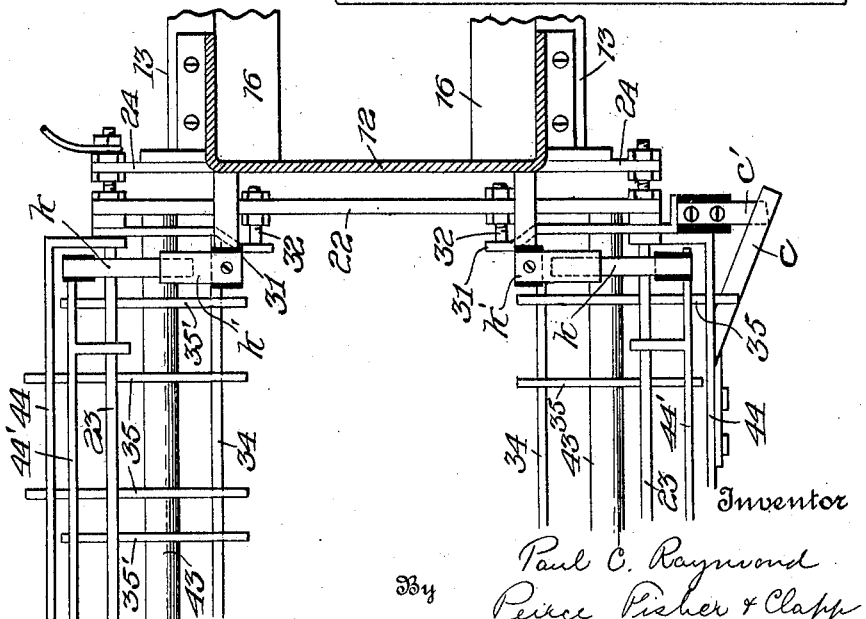
Inventor
Paul C. Raymond
By Peirce, Fisher & Clapp
Attorney

UNITED STATES PATENT OFFICE.

PAUL C. RAYMOND, OF THE UNITED STATES NATIONAL ARMY.

RECORDING SYSTEM AND SELECTOR MECHANISM THEREFOR.

1,393,827.  Specification of Letters Patent.  Patented Oct. 18, 1921.

Application filed July 15, 1918. Serial No. 245,077.

*To all whom it may concern:*

Be it known that I, PAUL C. RAYMOND, a citizen of the United States, formerly a resident of Buffalo, county of Erie, State of New York, and a member of the United States National Army, have invented certain new and useful Improvements in Recording Systems and Selector Mechanism Therefor, of which the following is a specification.

The invention relates to an improved recording system and to selector mechanism arranged to be controlled by record sheets or cards having data indicated thereon by perforations, indentations or the like. The invention seeks to provide an improved arrangement of records and selector mechanism whereby the record sheets or cards having any single item, groups or combinations of items indicated thereon may be selected and, if desired, arranged to control the operation of an actuating member, which in turn controls a suitable indicator, counter or register. A further object of the invention is to provide a record sheet or card having improved means for indicating items or numbers or groups of items or numbers representing different data and kinds of data thereon. The invention also seeks to adapt the recording system and selecting apparatus for use in connection with stencils or embossed plates, together with means for imprinting addresses or other information recorded on the stencils or plates and which are picked out or chosen by the selector mechanism in accordance with different predetermined requirements or restrictions.

The invention consists in the features of improvement hereinafter set forth and more particularly pointed out in the appended claims. While the present improved records and selecting apparatus can be readily adapted for use in connection with tabulating or registering mechanism, the invention is shown in the drawings in connection with the improved stencil cards and printing mechanism.

Figures 8, 9:
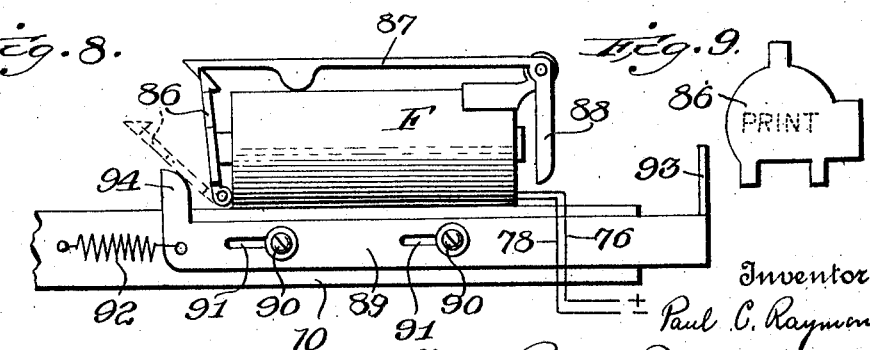

In the drawings, Figure 1 is a plan view of the improved apparatus, together with a diagram of the electric circuits. Fig. 2 is enlarged plan view of the selector mechanism forming a part of the improved apparatus, with certain parts broken away to more clearly show the construction. Figs. 3 and 4 are vertical sections on the lines 3—3 and 4—4, respectively, of Fig. 2. Figs. 5 and 6 are enlarged detail perspective views of parts of the selector mechanism. Fig. 7 is an enlarged vertical section on the line 7—7 of Fig. 1, showing the print mechanism. Figs. 8 and 9 are enlarged detail views of the indicator associated with the print mechanism. Fig. 10 is a plan view of one of the combined record and stencil cards. Figs. 11 and 12 are detail plan and sectional views, respectively, illustrating a modification of the improved selector mechanism.

Individual records may be formed on a continuous sheet of paper or the like, but preferably separate cards are employed and, in the particular embodiment of the invention set forth, the cards are in the form of rectangular frames and carry suitable stencil sheets or plates. In the combined record and stencil cards illustrated in the drawings, the body $a$ of the card is formed of quite thick pasteboard or the like, is rectangular in outline and the central portion is cut away to form a space within which a sheet $b$ of thin stencil paper is suitably mounted. The items or data recorded on the cards may, of course, pertain to different persons, things or transactions and the stencil sheets may bear different items of information relating thereto. The card illustrated as an example in Fig. 10 is assumed to be one of a number of cards upon each of which is recorded data pertaining to different individuals of a mailing list and the stencils of the cards bear the names and addresses of the different individuals on the list.

Each record card has a number of index mark positions which may be variously arranged and the different statistics or data may be recorded by forming perforations, indentations or the like in the different index mark positions. Preferably, the latter are arranged in two columns at the longer opposite side edges of the card and, on each edge, the positions are numbered to represent "units," "tens," "hundreds" and "thousands." Preferably, also, the record of the different items is made by notching the edges of the cards in the proper index mark positions, as shown in Fig. 10. Thus, the numbered card illustrated is notched at its upper edge to represent the number 6943. The various numbers so recorded on the different cards may, of course, represent different data and also different kinds or classes of data. Thus, in the example shown, the index mark positions are divided into different fields corresponding respectively to the "units," "tens," "hundreds" and "thousands" and the positions in the "units" field represent information relative to the family of the individual to whom the card pertains. Similarly, the positions in the "tens" field represent the kind of house in which the individual lives, those in the "hundreds" field represent the city or section of the country in which he lives and those in the "thousands" field represent his probable income. The positions on opposite edges of the card may pertain to the same or to different individuals or things as desired. In the record illustrated as an example, the index mark positions on the lower edge indicate additional data pertaining to the same individual whose name and address are carried by the stencil sheet.

Preferably, in addition to the numbered positions, such record card or sheet is provided with extra index mark positions represented in the example shown in Fig. 10 by "0" and "x" positions associated respectively with the "units," "tens," "hundreds" and "thousands" positions. The extra index mark positions may be employed in different ways in combination with the numbered index mark positions, so that the number of different combinations of items which may be recorded in a small space, for example, along the opposite edges of the card as shown, is very large.

The improved selecting apparatus is designed to pick out different cards and different items or combinations of items recorded on the cards, as predetermined by the user. The selecting apparatus illustrated is mounted upon a base board 10 which is suitably supported on feet 11 (see Fig. 7). The cards are placed in the apparatus in a pile or stack between two vertical U-shaped guides 12 which are formed of sheet metal and are adapted to engage the inner and outer ends, respectively, of the stack of cards. One of these guides is secured to the central portion of one edge of the base board and the other to two supports 13 which are fixed to the base board and project laterally therefrom. Preferably, as shown, a sheet metal portion 14 integral with the outer guide 12 extends across and is secured to the outer ends of the supports 13. The lower portions of the guides 12 snugly engage the ends of the cards but, preferably as shown, one of the guides is slightly inclined outwardly so that the stack of cards can be readily placed in position.

When the apparatus is in operation, the cards are moved from the stack, one at a time, by a plunger or sliding plate 15 which is arranged to reciprocate on a pair of horizontal guides 16 mounted on the supports 13 at the lower ends of the vertical card guides 12. An arm 17 fixed to the slide 15 is connected at its lower end by a link 18 to one arm of a bell crank lever 19. The latter (see Figs. 1 and 4) is arranged below the base board 10 and is mounted to swing upon a pivot 20. By oscillating the lever 19, the slide 15 is reciprocated to move the cards one at a time through an opening 21 formed at the lower end of the inner guide 12 and into operative relation with the selector mechanism.

The portion of the selecting apparatus which is directly controlled by the record sheets or cards is arranged adjacent the lower end of the inner guide 12 and is carried upon two horizontal plates or bars 22. The latter are connected at their ends by two rods 23 and the outer ends of these rods extend through and are fixed to lugs 24 that project laterally from the lower end of the inner guide 12. The inner plate or bar 22 is fixed to a part 25 (see Fig. 4), which together with the lugs 24, serve to hold the selector frame somewhat above the upper face of the base board 10.

At each side of the selector frame is provided a support for a set of selecting feelers or fingers. Each of these supports comprises a series of thin sheet metal plates 26 which are substantially square in outline and which are mounted upon a series of three rods 27 (see Figs. 2, 3 and 6). Two of these rods pass through perforations in the lower corners of the plates 26 and one through perforated lugs 28 on the upper edges of the plates. The series of plates 26 are held apart in spaced relation by circular washers 29 mounted on the upper rod 27 and by elongated washers 30 mounted on the two lower rods. At their ends the rods 27 are fixed to plates 31, which in turn are carried upon the rods 23 of the selector frame and at their inner ends are connected by studs 32 to the side bars 22 of the selector frame. Each of the plates 26 is also provided with an inwardly projecting perforated lug 33 and these lugs carry pivot rods 34 whereon the selecting feelers or fingers 35 are adapted to oscillate. The latter are mounted in position between the plates 26 of the holders and each comprises an upper horizontal portion (see Fig. 5) and a downwardly inclined inner end having a semi-circular portion 36 which is notched to fit over the pivot rod 34 and which is provided at the extreme lower end with a tooth 37.

The selecting feelers 35 are adapted to be removably inserted between the plates 26 and the holders therefor and are held in place by sheet metal plates 38. The latter are pivotally mounted at their upper ends on rods 39 extending between the side pieces 31 and springs 40 engaging the same are arranged to press the lower ends of the plates into engagement with the rounded semi-circular portions 36 of the feelers. Preferably, as shown, the lower edges of these plates are rounded so that they will not interfere with the oscillation of the feelers upon the pivot rods 34.

Two guide plates 41 for the record sheets or cards are mounted upon the feeler holders, being held in place against the lower edges of the plates 26 and washers 30 by rods 42 which are fixed at their ends to depending lugs on the side bars 22 (see Figs. 3 and 4). When the individual record cards are moved from the stack by the slides 15, they are pushed beneath the outer bar 22 of the selector frame and on to the inner edges of the guides 41, as shown in Fig. 4. Preferably, the outer ends of the guides 41 are slightly inclined downwardly to facilitate this operation. When the card is thus placed in position in the selector frame, the notches in its edges are adapted to be engaged by the teeth 37 on the lower inner ends of the fillers 35 but, as the card is moved to position in the frame, the teeth 37 of the feelers are held out of its path of movement by two rods 43 which extend through large central openings in the holder plates 26 and are journaled at their ends in the side bars 22 of the selector frame. These rods extend beneath the horizontal portions of the feelers and hold the latter in the position shown in Fig. 3, with the teeth 37 out of the path of movement of the cards so that the latter can be moved into position between the guides 41 and the rounded portions 33 and 36 of the plates and feelers. The rods 43, however, are provided with flat side faces and means are provided for oscillating the rods to thereby release or trip the feelers and permit the teeth 37 thereof to engage the opposite side edges of the cards and enter the notches of the cards if in alinement therewith.

The spaces between the plates 26 of the feeler holders correspond to the different index mark positions of the record cards so that, in setting up the apparatus for use, the feelers or fingers can be placed in position to engage the notches of the cards which correspond to any particular item or any particular groups or combinations of items. The feelers in each holder coöperate with an actuating member, or if desired, with two or more actuating members. In the form shown in Figs. 1 to 4 inclusive, the actuating member associated with each holder is in the form of a bail 44 having inwardly extending lugs 45 at its ends which are mounted upon the rods 23 that extend between the side pieces 22. Springs 47 coiled about the pivot rod engage the actuating members 44 and tend to depress the same into engagement with the outer ends of the selecting feelers or fingers 35.

In the shown position of the parts, the rods 43 normally uphold the fingers 35 and actuating members 44 against the tension of the springs 47, but when one of the record cards is in position in the selector frame and the rods 43 are oscillated, the springs 47 tend to depress the actuating members 44 and the outer ends of the feelers are forced against the edges of the cards and into the notches in the cards if in alinement therewith. If only one feeler is in position in the holder and is located to correspond to a certain item, this feeler and the actuating member 44 will be shifted whenever a card having a notch corresponding to that particular item is in position in the selector. If two or more feelers or fingers are in place, the actuating member 44 can only be depressed if the teeth 37 on all of the feelers or fingers enter notches in the card. Hence, the member 44 will only be operated by cards having notches on one edge corresponding to the feelers in position in one of the holders. Since the feelers or fingers are readily removable and can be set in any desired position corresponding to the various index mark positions representing the different items or classes of items, it is obvious that the selector may be set to pick out cards having any single item or any group or combination of items recorded thereon, as desired or predetermined by the user of the apparatus. Each of the actuating members 44 at the opposite sides of the frame are controlled by the combined operation of the selecting feelers or fingers at one side of the frame. As hereinafter described, the opposite sides of the selector may be used separately or conjointly and, if desired, may be arranged to operate counters or suitable tabulating or sorting mechanisms.

Means are provided for alternately operating the slide 15 which places the record cards in position and for oscillating the rods 43 to trip the selector fingers. As most clearly shown in Figs. 3 and 4, the inner ends of the rods 43 are provided with upwardly extending rock arms 48 which are connected for simultaneous movement by a link 49. The rear rock arm is connected by a rearwardly extending, laterally offset link 50 to the upper end of an oscillating arm 51. The latter is pivoted intermediate its ends on a bracket 52 fixed to the base board. Its lower end extends through a slot or opening in the base board and is connected by a spring 53 to a stud 54 on the under side of the base. The arm 51 is shifted by a projection 55 on a slide 56. The latter is of inverted U-shape and is mounted on a pair of guides 57 held in raised position above the base board by studs 58. A cross rod 59 is fixed to the lower portion of the slide 56 and extends laterally beneath the guides 57. This rod engages the rear end of a longitudinally movable rod 60 having a plate 61 fixed to its forward end. A guide roller 62 on the rod and guide lugs 63 on the plate engage the upper surface of the base 10. A depending arm 64 extends downwardly through a slot 65 in the base and its lower end (see Figs. 1 and 7) is connected by a link 66 to one arm of the bellcrank 19.

When the slide 56 is moved forwardly, the lug 55 thereon engages the upper end of the oscillating arm or lever 51 and shifts it to the dotted position indicated in Fig. 3 against the tension of the spring 53. The rods or shafts 43 are thereby oscillated to bring their flattened portions beneath the selector feelers 35 so that the teeth 37 of the feelers may engage the opposite side edges of the record card in position in the selector frame. If all of the feelers in a certain position on either side of the frame enter notches in the card, the corresponding actuating member 44 is shifted by its spring 47. On the forward movement of the slide 56, the sliding plate 15 is moved to its extreme outer position clear of the cards in the holders or guides 12. At the end of the forward movement of the slide 56, the lug 55 thereon moves past the upper end of the arms 51 and the spring 53 restores the arm 51 and shifts the rods 43 to normal position with the outer end of the arm engaging a spring buffer or stop 67 so that the selector feelers 35 and actuating member 44 are returned to normal position. On the backward movement of the slide 56, the plate 15 is moved inwardly to push the next record card into the selector frame and force the previous card therefrom. During this backward movement, the lug 55 passes over the end of the arm 51 which is yieldingly held in position by the spring stop 67. The slide plate or plunger 15 is held in engagement with its guide 16 by a cross pin 68 extending through the arm 17 and beneath the guides 13 (see Fig. 4). The rod 60 is held against vertical movement by a similar cross pin 69 extending through the arm 64 and beneath the lower edges of the slot 65. To accurately position the record cards in the selector frame, the inward movement of the slide plate is limited by an adjustable stop 70 fixed to a projecting bracket 71 on the base board and arranged to engage the arm 17.

The actuating members 44 which are controlled by the record cards and selector feelers may operate tabulating, registering or sorting mechanism, as desired, and effect such operation either mechanically or electrically. In the preferred embodiment of the invention, these actuating members control electric circuits having switch mechanism therein arranged to effect the separate or conjoint action of the actuating members at opposite sides of the selector frame. A diagram of the preferred arrangement of the circuits is shown in Fig. 1.

In the arrangement shown, current is derived for the circuits from battery cells 72 secured to the under side of the base board 10. One terminal of the battery is connected by a conductor 73 to the metal selector frame and through this frame to a contact $c$ mounted on one of the actuating members 44. The conductor 73 is also connected by a branched conductor 74 to one of the contacts $d$ of a knife switch D. The movable contact $c$ is arranged to coöperate with a fixed insulated contact $c'$ which is connected by a conductor 75 to a knife switch E. The latter has a contact $e$ which is connected by a branched conductor 76 to a magnet F and to an audible electric bell or buzzer G, the magnet F being mounted at the upper rear portion of the base board and the bell or buzzer G on the lower side of the front portion of the base. The same poles of the magnet F and of the electric bell are also connected by the branched conductor 76 and a conductor 77 to a fixed insulated contact $h'$ which is arranged to coöperate with the contact arm $h$ that is fixed to but is insulated from the other actuating member 44. Return conductors 78 and 79 extend from the magnet F and electric bell G to a knife switch J. The contact or terminal $j$ of this switch is connected by a conductor 80 to the opposite terminal of the battery. In addition to the contacts $e$ and $d$, the switches E and D are provided with contacts $e'$ and $d'$ which are connected by a conductor 81 and each switch is so arranged that it may be engaged with either one of its contacts.

In operation, the switch J is engaged with its contact or terminal $j$ to close the battery circuit at this point. With switch E in engagement with its contact or terminal $e$ and with switch D in engagement with its terminal $d'$, the magnet F and electric bell G will be operated only when the pair of contacts $c$ and $c'$ are closed and no circuit will be closed when the contacts $h$ and $h'$ are engaged. These pairs of contacts in the arrangement shown are normally held open but are engaged when the corresponding actuating member 44 is shifted. Thus, when the contacts $c$ and $c'$ are engaged, the circuit is closed from battery by conductor 73 to the selector frame, thence through contacts $c$ and $c'$, conductor 75, switch E and its contact $e$, branched conductor 76 to magnet F and electric bell G and back to battery by conductors 78, 79, switch J and its contact $j$ and conductor 80. No circuit, however, will be closed by the engagement of the contacts $h$ and $h'$. If switch E is disengaged from contact $e$ and switch D is engaged with its contact or terminal $d$, then, when the contacts $h$ and $h'$ are engaged by the operation of the corresponding actuating member 44, a circuit is closed from battery by conductor 73, branched conductor 74, contact $d$, switch D, thence by conductor 82 which is connected to the insulated contact $h$, contact $h'$, conductors 77 and 76 to the electric bell G and magnet F and back to battery by conductors 78, 79, switch J and conductor 80. Thus, the switches E and D may be so arranged that the magnet F and electric bell G will be operated only when the actuating member on one side of the selector frame is shifted to engage the corresponding pair of contacts. Under such circumstances, the record cards having certain predetermined items or combinations of items indicated along one of the edges thereof may be selected. Or, by placing the switches E and D in engagement with the contacts $c$ and $d$, the electric switch will be closed through the magnet F and electric bell G when either of the actuating members is shifted to engage either pair of contacts. Under such circumstances, cards having certain items or combinations of items indicated along one edge thereof and also cards having certain items or combinations of items indicated along the opposite edge can be selected.

By placing the switches E and D in engagement with their contacts or terminals $c'$ and $d'$, both actuating members must be shifted to close both pairs of contacts in order to complete the circuit. Under such circumstances, the current flows from battery by conductor 73 to the selector frame, engaged contacts $c$ and $c'$, conductor 75, switch E and its contact $e'$, conductor 81, contact $d'$ and switch D, conductor 82, contacts $h$ and $h'$ and conductors 77 and 76 to bell G and magnet F and back to battery as before, through conductors 78, 79, switch J and conductor 80. Under such circumstances, cards having certain combinations and characteristics indicated on opposite side edges may be selected.

A modified arrangement of the selector fingers and parts and circuits controlled thereby is shown in Figs. 11 and 12. In this form, an additional actuating member 44' is provided at each side of the selector frame and is arranged to be controlled by a set of relatively short selector fingers 35'. These supplemental actuating members are provided with insulated contact arms $k$ which are arranged to be shifted into engagement with the fixed insulated contacts $k'$. In other respects, the construction shown in Figs. 11 and 12 is entirely similar to that shown in Figs. 1 to 4 inclusive, but in Figs. 11 and 12, for the sake of clearness the separating plates and washers of the holders for the selector fingers are omitted.

As indicated in Fig. 12, the additional contacts $k$ and $k'$ control a supplemental circuit 83 extending from a battery 84 through the pairs of contacts $k$ and $k'$ to a relay magnet R. Switches 85 are provided in this circuit so arranged that either pair of contacts may be cut out or both connected in series, as shown in Fig. 12. The relay R controls an armature $r$ which is arranged to open a pair of normally engaged contacts 21 which are interposed in the conductor 80 of the main operating circuit.

The arrangement set forth in Figs. 11 and 12 is more particularly adapted for selecting cards in accordance with restrictions or negative requirements. That is to say, to select all cards in accordance with certain items or combinations of items, but rejecting from the cards so selected all those having certain other items. For example, it may be required to pick out from the list all individuals of a certain age and having other characteristics or qualifications, but not Germans. Under such circumstances, the relatively long selecting fingers 35 would be set to coöperate with the actuating members 44 in accordance with the positive qualifications or characteristics, and the user would set the relatively short selecting fingers 35' in accordance with the negative items or characteristics which are to be rejected. Under such circumstances, the longer selecting fingers 35 and actuating members 44 will operate in the manner already described in connection with all cards having the positive requirements indicated thereon but any card having also the negative requirement or characteristic which is to be rejected will effect the operation of the supplemental actuating bar or bars 44' to thereby close the circuit 83 by means of the contacts $k$, $k'$ and operate the relay R. This relay opens the main operating circuit and no selection will be effected.

By setting the feelers 35 and 35' and by manipulating the switches E, D and 85, the selector mechanism can be readily set to make selections in accordance with different items and in accordance with different positive and negative requirements, and it is not necessary to change the electric wiring of the selector mechanism. The holders for the selecting feelers or fingers are provided with seats corresponding in position to the numbered index mark positions and also with seats corresponding to extra index mark positions which are associated respectively with the "units", "tens", "hundreds", etc., positions, and by this means the selection of records in accordance with various requirements is greatly facilitated. For example, the records having items recorded only in the "units" field would have the associated "$x$" position also punched or notched; those having items recorded only in the "units" and "tens" field would have the "x" position associated with the "tens" field punched or notched; those having items in the "units", "tens" and "hundreds" field, would bear marks in the "x" position associated with the "hundreds" field. Under such circumstances, it would be possible to select or pick out all cards marked, for example, in positions 4 or 74 or 174 by simply placing a single feeler in the position corresponding to the 4 position of the "units" field. But if it was desired to select all records marked in position 4 and exclude all those marked in positions 74 or 174, or any other number ending in 4, it would only be necessary to place feelers in the holder in the positions corresponding to the 4 and "x" positions of the "units" field. Or, by placing a feeler in the "x" position associated with the "tens", and feelers in one of the "tens" and in one of the "units" positions, records marked to correspond with any number less than one hundred, for example 74, could be selected but excluding records marked to correspond with number greater than one hundred but ending in 74. In this way, many selections in accordance with various predetermined requirements or conditions can be made by running a set of records once through the selector mechanism which otherwise would require a number of such operations.

Obviously, if desired, the main magnet F may control a counter. In the form shown, it is arranged to effect the operation of an indicator drop 86 which is held in normal position by a catch 87 connected to the armature 88 of the magnet (see Fig. 8). When the magnet is actuated, the drop is shifted to indicating position. A resetting member 89 is mounted on one edge of the base board 10 by a pair of screws 90 which extends through slots 91 therein and the member is held in normal position by the spring 92. On the return movement of the slide 56, its rear end will engage the rearwardly turned rear end portion 93 of the resetting member 89 and the upwardly turned forward end portion 94 will, if the drop has been actuated, return the latter to normal position.

Where stencil record cards are employed, addresses or other information contained on the selected cards can be printed by suitable means. In the arrangement shown, the combined record and stencil cards pass from the selector frame (see Figs. 1, 4 and 7) into engagement with a pair of guides 95 the inner edges of which are shaped to engage the opposite longer side edges of the cards. At their outer ends, these guides are fixed to a bracket 96 which in turn at one end is fixed to the base board 10 and projects upwardly therefrom. The inner ends of the guides 95 are fixed to the bracket 25 (see Fig. 4) of inverted U-shape, which is secured to the adjacent side bar 22 of the selector frame. The card guides 95 are arranged as shown directly in front of the guides 57 on which the slide 56 is mounted. A U-shaped frame 98 pivotally mounted at the forward end of the slide 56 carries an impression roller 99 and a series of inking rollers 100. It is also provided at its forward portion with an operating handle 101. By means of the latter, the slide 56 can be readily reciprocated and the impression roller 99 brought into and out of position over the stencil cards in the guides 95. The plate 61 fixed to the rod 60 also reciprocates with the parts and as shown, is provided with a downwardly and forwardly projecting triangular portion 102 which terminates in a lug 103 extending into the slot 65 in the base board. By placing envelops, wrappers or the like on the base board beneath the guides 95, the plate or platen 61 will act to lift the same into proper position to receive the impression from a stencil card in the guides 95 when the roller 99 is depressed and moved over the stencil.

A business concern frequently desires to send out notices, advertising circulars and the like only to individuals on its mailing list having certain characteristics or qualifications. By properly setting the selector mechanism, the stencil cards bearing the names and addresses of the individuals on the mailing list can be rapidly run through the selector mechanism, the cards corresponding to the desired individuals selected and the addresses thereon imprinted on envelops, wrappers or the like.

It is obvious that the improved record system and selecting apparatus may be employed for other purposes than that specifically set forth and that numerous other changes may be made without departure from the essentials of the invention as defined by the claims.

I claim as my invention:—

1. In a record sheet controlled selector mechanism, the combination of a set of feelers individually adjustable into and out of operative position and individually movable in operative position under control of the record sheets, means for bringing the feelers in operative position into engagement with the record sheets, and a common actuator selectively controlled by the combined movement of all the feelers, whether one or more, in operative position.

2 In a record sheet controlled selector mechanism, the combination of a holder having seats corresponding in number and position with the index mark positions of the record sheets, a set of selecting feelers individually adjustable into and out of operative position in said seats and individually movable in operative position under control of the record sheets, means for engaging the feelers in operative position with the record sheets, and a common actuating member selectively controlled by the combined movement of all of the feelers in operative position in said seats.

3. In a record sheet controlled selector, the combination of selecting feelers individually adjustable into and out of operative position and individually movable in operative position under control of the record sheets, means for bringing the record sheets successively into engagement with the feelers in operative position, and a common actuating member mechanically controlled by the combined movement of the feelers, whether one or more, in operative position.

4. In a record sheet controlled selector, the combination of selecting feelers individually adjustable into and out of operative position and individually movable in operative position under control of the record sheets, means for bringing the record sheets successively into engagement with the feelers in operative position, a common actuating member selectively and mechanically controlled by the combined movement of the feelers in operative position, and an electric circuit controlled by said actuator.

5. In a record sheet controlled selector, the combination of a number of selecting feelers adapted to be set in and removed from operative position, means for bringing the record sheets successively into engagement with the feelers in operative position, and a plurality of actuating members each arranged to be controlled by one of said feelers or by the combined operation of a number of feelers.

6. In a record sheet controlled selector, the combination of a number of selecting feelers adapted to be set in and removed from operative position, means for bringing the record sheets successively into engagement with the feelers in operative position, a plurality of actuating members each arranged to be selectively controlled by one or by a number of said feelers, and means adapted to be controlled by said actuating members individually or by the combined operation of said actuating members.

7. In a record sheet controlled selector, the combination of a number of selecting feelers adapted to be set in and removed from operative position, and means for bringing the record sheets successively into engagement with the feelers in operative position, a number of pairs of contacts each arranged to be controlled by one or by a combination of said feelers, and an electro-magnetic device arranged to be controlled by one or by a combination of said pairs of contacts.

8. In a record sheet controlled selector, the combination of a number of selecting feelers adapted to be set in and removed from operative position, means for bringing the record sheets successively into engagement with the feelers in operative position, a number of pairs of contacts each adapted to be controlled by one or by a combination of said feelers, an electro-magnetic device, and switch mechanism arranged to connect said pairs of contacts separately to said electro-magnetic device or in series or in parallel therewith.

9. In a record sheet controlled selector, the combination of a number of selecting feelers adapted to be set in and removed from operative position, means for bringing the record sheets successively into engagement with the feelers in operative position, a plurality of actuating members adapted to be mechanically operated by one or by a combination of said selecting feelers, pairs of contacts controlled by said actuating members, an electro-magnetic device, and switch mechanism for connecting said pairs of contacts separately with said electro-magnetic device or in series or in parallel therewith.

10. In a record sheet controlled selector, the combination of a number of selecting feelers adapted to be set in and removed from operative position, means for bringing the record sheets successively into engagement with the feelers in operative position, a number of shiftable contacts, each of which is arranged to be controlled by one or by a combination of said feelers, a relay controlled by one of said contacts, and an electric circuit controlled by the combined operation of said relay and of another of said contacts.

11. In a record sheet controlled selector, the combination of a number of selecting feelers adapted to be set in and removed from operative position, means for bringing the record sheets successively into engagement with the feelers in operative position, a number of shiftable contacts, each of which is arranged to be controlled by one or by a combination of said selecting feelers, a relay adapted to be controlled by one or by a number of said contacts, and an electro-magnetic device arranged to be controlled by said relay and by one or a combination of other of said contacts.

12. In a record controlled selecting apparatus, the combination of a set of record engaging feelers adapted to be variably set in operative position, means for successively bringing the records into engagement with the feelers in operative position, a number of actuating members each adapted to be controlled by one or a combination of said feelers, and means variably controlled by said actuating members in accordance with a positive or a negative recorded item or combination of such items.

13. In apparatus of the class described, the combination of record cards having index mark positions along opposite side edges thereof, a pair of holders having seats corresponding to the index mark positions of the records, selecting feelers removably mounted in the seats of said holders, means for successively feeding the cards into position between said holders and for engaging the feelers and cards, and actuating members each controlled by one or more feelers in one of said holders.

14. In apparatus of the class described, the combination of record cards having index mark positions along opposite side edges thereof, a pair of holders having seats corresponding to the index mark positions of the records, selecting feelers removably mounted in the seats of said holders, means for successively feeding the cards into position between said holders and for engaging the feelers and cards, actuating members associated with said holders and each controlled by one or more feelers in one of said holders, and indicating means or the like arranged to be controlled by one of said actuating members or by the combined operation of a plurality of said members.

15. In apparatus of the class described, the combination of record cards having index mark positions along opposite side edges thereof, a pair of holders having seats corresponding to the index mark positions of the records, selecting feelers removably mounted in the seats of said holders, means for successively feeding the cards into position between said holders and for engaging the feelers and cards, pairs of contacts each controlled by one or more of the feelers on each of said holders, and an operating electric circuit arranged to be controlled by a selected pair of contacts or by the combined operation of a predetermined group of said pairs of contacts.

16. In a recording and selecting system, the combination of records having index mark positions corresponding to the "units," "tens," "hundreds," etc., and additional index mark positions associated respectively with said "units," "tens," "hundreds," etc., positions, holding means having seats corresponding to said numbered and said additional index mark positions, selecting feelers adapted to be variably positioned in said seats and controlled by said records, and an actuating member or members controlled by said feelers.

17. In a recording and selecting system, the combination of records having index mark positions corresponding to the "units," "tens," "hundreds," etc., and additional index mark positions associated respectively with said "units," "tens," "hundreds," etc., positions, and a set of selecting feelers controlled by said records and adapted to be adjustably set in operative position in accordance with the "units," "tens," "hundreds," etc., and the additional index mark positions of said records, and an actuating member or members adapted to be controlled by one or more of said feelers.

18. In an apparatus of the class described, a selector comprising a set of feelers adapted to be set in position corresponding to the index mark positions of the records, a plurality of shiftable contacts, each adapted to be selectively controlled by one or by the combined operation of a number of said feelers, circuits controlled by said contacts, and adjustable switch mechanism interposed in said circuits and adapted to be set in different positions to effect the selection of the records in accordance with different items or combinations of items recorded thereon.

19. In an apparatus of the class described, the combination of a set of record engaging feelers adapted to be adjustably set in positions corresponding with the index mark positions of the records, a plurality of shiftable contacts, each of which is arranged to be controlled by one or by the combined operation of a plurality of said feelers, a relay controlled by certain of said contacts, a magnet controlled by the combined operation of said relay and certain of other said contacts, and adjustable switches interposed in the circuits of said relay and said magnet and adapted to be set in position to variably modify the operation of said selector in accordance with different predetermined requirements.

PAUL C. RAYMOND.